US006878781B2

(12) United States Patent
Zarnoch et al.

(10) Patent No.: US 6,878,781 B2
(45) Date of Patent: *Apr. 12, 2005

(54) POLY(ARYLENE ETHER)-CONTAINING THERMOSET COMPOSITION IN POWDER FORM, METHOD FOR THE PREPARATION THEREOF, AND ARTICLES DERIVED THEREFROM

(75) Inventors: Kenneth Paul Zarnoch, Scotia, NY (US); Gary William Yeager, Schenectady, NY (US); Hua Guo, Selkirk, NY (US)

(73) Assignee: General Electric, Pittsfield, MA (US)

( * ) Notice: Subject to any disclaimer, the term of this patent is extended or adjusted under 35 U.S.C. 154(b) by 548 days.

This patent is subject to a terminal disclaimer.

(21) Appl. No.: 09/681,376

(22) Filed: Mar. 27, 2001

(65) Prior Publication Data

US 2002/0173597 A1 Nov. 21, 2002

(51) Int. Cl.[7] .......................... C08F 283/08; C08F 2/46; C08L 71/10
(52) U.S. Cl. ....................... 525/391; 525/132; 525/390; 525/397; 525/534; 522/71; 522/135; 524/611
(58) Field of Search ................................. 525/132, 390, 525/391, 397, 534; 522/71, 73, 81, 77, 83, 167, 160, 134, 135, 142, 144; 524/430, 432, 433, 436, 437, 438, 440, 441, 611

(56) References Cited

U.S. PATENT DOCUMENTS

| 3,219,625 A | 11/1965 | Blanchard et al. |
|---|---|---|
| 3,268,561 A | 8/1966 | Peppel et al. |
| 3,306,875 A | 2/1967 | Hay |
| 3,375,228 A | 3/1968 | Holoch et al. |
| 3,557,045 A | 1/1971 | Wright et al. |
| 3,597,216 A | 8/1971 | Berardinelli et al. |
| 3,637,578 A | 1/1972 | Wright et al. |
| 3,883,612 A | 5/1975 | Pratt et al. |
| 3,936,414 A | 2/1976 | Wright et al. |
| 4,028,341 A | 6/1977 | Hay |
| 4,048,143 A | 9/1977 | Hay et al. |
| 4,092,294 A | 5/1978 | Bennett, Jr. et al. |
| 4,148,843 A | 4/1979 | Goossens |
| 4,165,422 A | 8/1979 | White |
| 4,327,013 A | 4/1982 | Peters |
| 4,440,923 A | 4/1984 | Bartmann et al. |
| 4,562,243 A | 12/1985 | Percec |
| 4,565,684 A | 1/1986 | Tibbetts et al. |
| 4,572,813 A | 2/1986 | Arakawa |
| 4,604,417 A | 8/1986 | Cottman |
| 4,618,703 A | 10/1986 | Thanawalla et al. |
| 4,634,742 A | 1/1987 | Percec |
| 4,663,230 A | 5/1987 | Tennent |
| 4,663,402 A | 5/1987 | Percec et al. |
| 4,665,137 A | 5/1987 | Percec |
| 4,677,185 A | 6/1987 | Heitz et al. |
| 4,701,514 A | 10/1987 | Percec |
| 4,760,118 A | 7/1988 | White et al. |
| H521 H | 9/1988 | Fan |
| 4,806,601 A | 2/1989 | Percec |
| 4,816,289 A | 3/1989 | Komatsu et al. |
| 4,816,515 A | 3/1989 | Weiss |
| 4,871,816 A | 10/1989 | Percec et al. |
| 4,874,826 A | 10/1989 | Sakamoto et al. |
| 4,876,078 A | 10/1989 | Arakawa et al. |
| 4,888,397 A | 12/1989 | van der Meer et al. |
| 4,923,932 A | 5/1990 | Katayose et al. |
| 5,021,523 A | 6/1991 | Iizuka et al. |
| 5,024,818 A | 6/1991 | Tibbetts et al. |
| 5,039,781 A | 8/1991 | Neugebauer et al. |
| 5,061,602 A | 10/1991 | Koch et al. |
| 5,071,922 A | 12/1991 | Nelissen et al. |
| 5,079,268 A | 1/1992 | Nelissen et al. |
| 5,091,480 A | 2/1992 | Percec |
| 5,118,748 A | 6/1992 | Fujita et al. |
| 5,165,909 A | 11/1992 | Tennent et al. |
| 5,171,761 A | 12/1992 | Penco et al. |
| 5,200,122 A | 4/1993 | Katoh et al. |
| 5,213,886 A | 5/1993 | Chao et al. |
| 5,218,030 A | 6/1993 | Katayose et al. |
| 5,219,951 A | 6/1993 | Nelissen et al. |
| 5,240,973 A | 8/1993 | Katoh et al. |
| 5,304,600 A | 4/1994 | Nelissen et al. |
| 5,310,820 A | 5/1994 | Nelissen et al. |
| 5,338,796 A | 8/1994 | Vianello et al. |
| 5,352,745 A | 10/1994 | Katayose et al. |
| 5,407,972 A | 4/1995 | Smith et al. |
| 5,589,152 A | 12/1996 | Tennent et al. |
| 5,591,382 A | 1/1997 | Nahass et al. |

(Continued)

FOREIGN PATENT DOCUMENTS

| DE | 31 17 514 A1 | 5/1981 |
|---|---|---|
| DE | 41 03 140 A1 | 2/1991 |
| EP | 0 135 124 A2 | 8/1984 |
| EP | 0 206 072 B2 | 6/1986 |
| EP | 0 261 574 B1 | 3/1988 |
| EP | 0 385 065 A1 | 1/1990 |
| EP | 0 498 088 A1 | 12/1991 |
| NL | 8902092 | 8/1989 |
| WO | WO 03/076495 | 9/2003 |

OTHER PUBLICATIONS

Coleen Pugh and V. Percec, "Group Transfer Polymerization of Some Unusual Acrylates and Methacrylates", Polym. Prepr. (Am. Chem. Soc., Div. Polym. Chem.), (1985), 26(2), 303–5.

U.S. Appl. No. 09/681,381, filed Mar. 27, 2001, Teutsch et al.

U.S. Appl. No. 09/683,214, filed Dec. 3, 2001, Yeager et al.

U.S. Appl. No. 09/683,352, filed Dec. 18, 2001, Braat et al.

(Continued)

*Primary Examiner*—Jeffrey B. Robertson

(57) ABSTRACT

A curable resin composition including a poly(arylene ether), an allylic monomer, and an acryloyl monomer may be formulated as a powder. The resin composition exhibits improved toughness, and it is useful in thermoset processing applications where use of powdered resins is preferred.

37 Claims, No Drawings

U.S. PATENT DOCUMENTS

| | | | |
|---|---|---|---|
| 5,612,425 | A | 3/1997 | Weber et al. |
| 5,834,565 | A | 11/1998 | Tracy et al. |
| 5,851,646 | A | 12/1998 | Takahashi et al. |
| 5,922,815 | A | 7/1999 | Aycock et al. |
| 5,965,663 | A | 10/1999 | Hayase |
| 6,022,550 | A | 2/2000 | Watanabe |
| 6,306,963 | B1 | 10/2001 | Lane et al. |
| 6,352,782 | B1 | 3/2002 | Yeager et al. |
| 6,384,176 | B1 | 5/2002 | Braat et al. |
| 6,770,107 | B1 * | 8/2004 | Teutsch et al. ............... 51/298 |
| 2001/0049046 | A1 | 12/2001 | Butler ......................... 429/34 |
| 2001/0053820 | A1 | 12/2001 | Yeager et al. |
| 2002/0005508 | A1 | 1/2002 | Butler et al. ................ 252/500 |
| 2002/0028337 | A1 | 3/2002 | Yeager et al. |
| 2002/0077447 | A1 | 6/2002 | Hwang et al. |

OTHER PUBLICATIONS

U.S. Appl. No. 09/765,065, filed Jan. 17, 2001, Zarnoch et al.

U.S. Appl. No. 10/063,152, filed Mar. 26, 2002, Braat et al.

U.S. Appl. No. 10/063,292, filed Apr. 9, 2002, Yeager et al.

U.S. Appl. No. 10/119,406, filed Apr. 9, 2002, Merfeld et al.

Derwent Abstract for JP08–245872.

US Patent Application, Filed on Jul. 2, 2002, 90 pages (Serial Number not yet assigned by PTO).

Chemical Abstracts Record for JP 08–012875.

PCT International Search Report, International Application No. PCT/US 01/43499, International Filing Date Nov. 14, 2001, Date of Mailing of the International Search Report Jun. 13, 2002.

* cited by examiner

POLY(ARYLENE ETHER)-CONTAINING THERMOSET COMPOSITION IN POWDER FORM, METHOD FOR THE PREPARATION THEREOF, AND ARTICLES DERIVED THEREFROM

BACKGROUND OF INVENTION

Thermoset compositions comprising poly(arylene ether) resins have been described in U.S. patent application Ser. No. 09/452,733, filed Dec. 1, 1999 now U.S. Pat. No. 6,352,782. These compositions exhibit excellent balance of properties, including heat resistance, stiffness, and toughness. However, known thermoset compositions comprising poly(arylene ether) resins generally exist as viscous liquids or pastes, making them unsuitable for processing methods in which curable powders are preferred.

While curable resin compositions in powder form, such as those including phenolic resins, are known, for some end-uses they are deficient in one or more properties such as heat resistance, stiffness, and toughness. There is a need for a curable thermoset composition in powder form that exhibits an improved post-curing property balance.

BRIEF SUMMARY OF INVENTION

Disclosed herein are several embodiments of a curable resin composition, a method for its preparation, the reaction products formed on curing the curable resin composition, and articles formed from the curable resin composition.

One embodiment is a curable resin composition comprising a poly(arylene ether), an allylic monomer, and an acryloyl monomer; wherein the composition is a powder.

Another embodiment is a cured resin composition comprising the reaction product of a curable resin composition comprising a poly(arylene ether), an allylic monomer, and an acryloyl monomer; wherein the curable resin composition is a powder.

Yet another embodiment is an article comprising the reaction product of the curable resin composition.

Still another embodiment is a method of forming a curable resin composition, comprising: blending a poly (arylene ether) and an allylic monomer to form a first intimate blend; blending the first intimate blend and an acryloyl monomer to form a second intimate blend; and processing the second intimate blend to form a curable powder.

DETAILED DESCRIPTION OF THE PREFERRED EMBODIMENTS

A curable resin composition comprises a poly(arylene ether);

an allylic monomer;

and an acryloyl monomer;

wherein the composition is a powder.

The composition may comprise any poly(arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly (arylene ether)s are known polymers comprising a plurality of structural units of the formula:

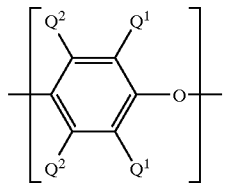

wherein for each structural unit, each $Q^1$ is independently halogen, primary or secondary $C_1$–$C_{12}$ alkyl, phenyl, $C_1$–$C_{12}$ haloalkyl, $C_1$–$C_{12}$ aminoalkyl, $C_1$–$C_{12}$ hydrocarbonoxy, or $C_2$–$C_{12}$ halohydrocarbonoxy wherein at least two carbon atoms separate the halogen and oxygen atoms; and each $Q^2$ is independently hydrogen, halogen, primary or secondary $C_1$–$C_{12}$ alkyl, phenyl, $C_1$–$C_{12}$ haloalkyl, $C_1$–$C_{12}$ aminoalkyl, $C_1$–$C_{12}$ hydrocarbonoxy, or $C_2$–$C_{12}$ halohydrocarbonoxy wherein at least two carbon atoms separate the halogen and oxygen atoms. Preferably, each $Q^1$ is independently $C_1$–$C_{12}$ alkyl or phenyl, especially $C_{1-4}$ alkyl, and each $Q^2$ is independently hydrogen or methyl.

Both homopolymer and copolymer poly(arylene ether)s are included. In one embodiment, the poly(arylene ether) is a homopolymer comprising 2,6-dimethyl-1,4-phenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Also included are poly(arylene ether)s containing moieties prepared by grafting vinyl monomers or polymers such as polystyrenes, as well as coupled poly(arylene ether) in which coupling agents such as low molecular weight polycarbonates, quinones, heterocycles, and formals undergo reaction with the hydroxy groups of two poly(arylene ether) chains to produce a higher molecular weight polymer. Poly(arylene ether)s further include combinations of any of the above.

The poly(arylene ether)s are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials. Suitable methods for the preparation and isolation of poly(arylene ether)s are disclosed in, for example, U.S. Pat. No. 3,219,625 to Blanchard et al., U.S. Pat. No. 3,306,875 to Hay, U.S. Pat. No. 4,028,341 to Hay, U.S. Pat. No. 4,092,294 to Bennett, Jr. et al., U.S. Pat. No. 4,440,923 to Bartmann et al., and U.S. Pat. No. 5,922,815 to Aycock et al.

In one embodiment, the composition comprises a poly (arylene ether) having less than 500 parts per million (ppm) of free hydroxyl groups. In other words, the poly(arylene ether) contains less than 500 micrograms of hydroxyl groups (as —OH) per gram of poly(arylene ether). The poly(arylene ether) preferably comprises less than 300 ppm of free hydroxyl groups, more preferably less than 100 ppm of free hydroxyl groups.

In one embodiment, the composition comprises a capped poly(arylene ether), which is defined herein as a poly (arylene ether) in which at least 50%, preferably at least 75%, more preferably at least 90%, yet more preferably at least 95%, even more preferably at least 99%, of the free hydroxyl groups present in the corresponding uncapped poly(arylene ether) have been removed by reaction with a capping agent.

The capped poly(arylene ether) may be represented by the structure $$Q\text{-}(J\text{-}K)_y$$

wherein Q is the residuum of a monohydric, dihydric, or polyhydric phenol, preferably the residuum of a monohydric or dihydric phenol, more preferably the residuum of a monohydric phenol; y is 1 to 100; J comprises recurring units having the structure

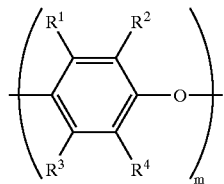

wherein m is 1 to about 200, preferably 2 to about 200, and $R^1$–$R^4$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbonoxy, $C_2$–$C_{12}$ halohydrocarbonoxy wherein at least two carbon atoms separate the halogen and oxygen atoms, or the like; and K is a capping group produced by reaction of the phenolic hydroxyl groups on the poly(arylene ether) with a capping reagent. The resulting capping group may be

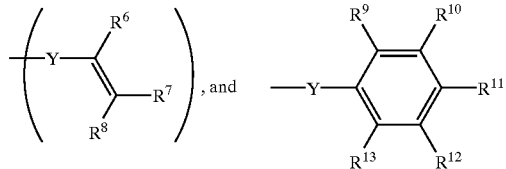

wherein $R^5$ is $C_1$–$C_{12}$ alkyl; $R^6$–$R^8$ are each independently hydrogen, $C_1$–$C_{12}$ alkyl, $C_2$–$C_{12}$ alkenyl, $C_6$–$C_{18}$ aryl, $C_7$–$C_{18}$ mixed (alkyl-aryl), $C_2$–$C_{12}$ alkoxycarbonyl, $C_7$–$C_{18}$ aryloxycarbonyl, $C_8$–$C_{18}$ mixed (alkyl-aryl) oxycarbonyl, nitrile, formyl, carboxylate, imidate, thiocarboxylate, or the like; $R^9$–$R^{13}$ are each independently hydrogen, halogen, $C_1$–$C_{12}$ alkyl, hydroxy, amino, or the like; and wherein Y is a divalent group having the structure

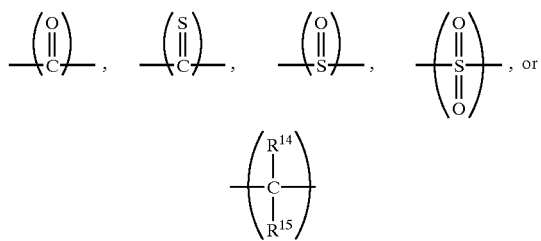

wherein $R^{14}$ and $R^{15}$ are each independently hydrogen, $C_1$–$C_{12}$ alkyl, or the like.

In one embodiment, Q is the residuum of a phenol, including polyfunctional phenols, and includes radicals of the structure

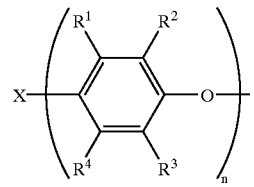

wherein $R^1$–$R^4$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbonoxy, $C_2$–$C_{12}$ halohydrocarbonoxy wherein at least two carbon atoms separate the halogen and oxygen atoms, or the like; X is hydrogen, $C_1$–$C_{20}$ alkyl, $C_6$–$C_{20}$ aryl, $C_7$–$C_{20}$ mixed alkyl-aryl hydrocarbons, or such hydrocarbon groups containing a substituent such as carboxylic acid, aldehyde, alcohol, amino, or the like; X also may be sulfur, sulfonyl, sulfuryl, oxygen, or other such bridging group having a valence of 2 or greater to result in various bis- or higher polyphenols; y and n are each independently 1 to about 100, preferably 1 to 3, and more preferably 1 to 2. In a preferred embodiment, y=n.

In one embodiment, the capped poly(arylene ether) is produced by capping a poly(arylene ether) consisting essentially of the polymerization product of at least one monohydric phenol having the structure

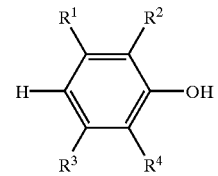

wherein $R^1$–$R^4$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbonoxy, $C_2$–$C_{12}$ halohydrocarbonoxy wherein at least two carbon atoms separate the halogen and oxygen atoms, or the like. Suitable monohydric phenols include those described in U.S. Pat. No. 3,306,875 to Hay, and highly preferred monohydric phenols include 2,6-dimethylphenol and 2,3,6-trimethylphenol.

In one embodiment, the capped poly(arylene ether) comprises at least one capping group having the structure

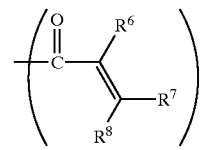

wherein $R^6$–$R^8$ are each independently hydrogen, $C_1$–$C_{12}$ alkyl, $C_2$–$C_{12}$ alkenyl, $C_6$–$C_{18}$ aryl, $C_7$–$C_{18}$ mixed (alkyl-aryl), $C_2$–$C_{12}$ alkoxycarbonyl, $C_7$–$C_{18}$ aryloxycarbonyl, $C_8$–$C_{18}$ mixed (alkyl-aryl)oxycarbonyl, nitrile, formyl, carboxylate, imidate, thiocarboxylate, or the like. Highly preferred capping groups include acrylate ($R^6=R^7=R^8=$ hydrogen) and methacrylate ($R^6=$methyl, $R^7=R^8=$ hydrogen).

In one embodiment, the capped poly(arylene ether) comprises at least one capping group having the structure

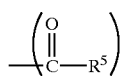

wherein $R^5$ is $C_1$–$C_{12}$ alkyl, preferably $C_1$–$C_6$ alkyl, more preferably methyl, ethyl, or isopropyl. It has surprisingly been found that the advantageous properties of the composition can be achieved even when the capped poly(arylene ether) lacks a polymerizable function such as a carbon-carbon double bond.

In another embodiment, the capped poly(arylene ether) comprises at least one capping group having the structure

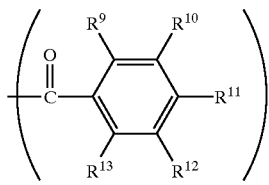

wherein $R^9$–$R^{13}$ are each independently hydrogen, halogen, $C_1$–$C_{12}$ alkyl, hydroxy, amino, or the like. Preferred capping groups of this type include salicylate ($R^9$ is hydroxy, and $R^{10}$–$R^{13}$ are hydrogen).

In one embodiment, the capped poly(arylene ether) is substantially free of amino substituents, including alkylamino and dialkylamino substituents, wherein substantially free means that the capped poly(arylene ether) contains less than about 300 micrograms, preferably less than about 200 micrograms, more preferably less than about 100 micrograms, of atomic nitrogen per gram of capped poly(arylene ether). Although many poly(arylene ether)s are synthesized by processes that result in the incorporation of amino substituents, it has been discovered that thermoset curing rates are increased when the capped poly(arylene ether) is substantially free of amino substituents. Poly(arylene ether)s substantially free of amino substituents may be synthesized directly or generated by heating amino-substituted poly(arylene ether)s to at least about 200° C. Alternatively, if the capped poly(arylene ether) contains amino substituents, it may be desirable to cure the composition at a temperature less than about 200° C.

There is no particular limitation on the method by which the capped poly(arylene ether) is prepared. The capped poly(arylene ether) may be formed by the reaction of an uncapped poly(arylene ether) with a capping agent. Capping agents include compounds that react with phenolic groups. Such compounds include both monomers and polymers containing, for example, anhydride groups, acid chloride groups, epoxy groups, carbonate groups, ester groups, isocyanate groups, cyanate ester groups, alkyl halide groups, or combinations comprising at least one of the foregoing groups. Capping agents are not limited to organic compounds as, for example, phosphorus and sulfur based capping agents also are included. Examples of capping agents include, for example, acetic anhydride, succinic anhydride, maleic anhydride, salicylic anhydride, polyesters comprising salicylate units, homopolyesters of salicylic acid, acrylic anhydride, methacrylic anhydride, glycidyl acrylate, glycidyl methacrylate, acetyl chloride, benzoyl chloride, diphenyl carbonates such as di(4-nitrophenyl)carbonate, acryloyl esters, methacryloyl esters, acetyl esters, phenylisocyanate, 3-isopropenyl-alpha,alpha-dimethylphenylisocyanate, cyanatobenzene, 2,2-bis(4-cyanatophenyl)propane), 3-(alpha-chloromethyl)styrene, 4-(alpha-chloromethyl) styrene, allyl bromide, and the like, carbonate and substituted derivatives thereof, and mixtures comprising at least one of the foregoing capping agents. These and other methods of forming capped poly(arylene ether)s are described, for example, in U.S. Pat. No. 3,375,228 to Holoch et al.; U.S. Pat. No. 4,148,843 to Goossens; U.S. Pat. Nos. 4,562,243, 4,663,402, 4,665,137, and 5,091,480 to Percec et al.; U.S. Pat. Nos. 5,071,922, 5,079,268, 5,304,600, and 5,310,820 to Nelissen et al.; U.S. Pat. No. 5,338,796 to Vianello et al.; and European Patent No. 261,574 B1 to Peters et al.

A capping catalyst may be employed in the reaction of an uncapped poly (arylene ether) with an anhydride. Examples of such compounds include those that are capable of catalyzing condensation of phenols with the capping agents described above. Useful materials are basic compounds including, for example, basic compound hydroxide salts such as sodium hydroxide, potassium hydroxide, tetraalkylammonium hydroxides, and the like; tertiary alkyl amines such as tributyl amine, triethylamine, dimethylbenzylamine, dimethylbutylamine, and the like; tertiary mixed alkylarylamines and substituted derivatives thereof such as dimethylaniline, and the like; heterocyclic amines such as imidazoles, pyridines, and substituted derivatives thereof such as 2-methylimidazole, 2-vinylimidazole, 4-(dimethylamino)pyridine, 4-(1-pyrrolino)pyridine, 4-(1-piperidino)pyridine, 2-vinylpyridine, 3-vinylpyridine, 4-vinylpyridine, and the like; and mixtures comprising at least one of the foregoing materials. Also useful are organometallic salts such as, for example, tin and zinc salts known to catalyze the condensation of, for example, isocyanates or cyanate esters with phenols. The organometallic salts useful in this regard are known to the art in numerous publications and patents well known to those skilled in this art.

The composition may comprise a blend of at least two capped poly(arylene ethers). Such blends may be prepared from individually prepared and isolated capped poly(arylene ethers). Alternatively, such blends may be prepared by reacting a single poly(arylene ether) with at least two capping agents.

There is no particular limitation on the molecular weight or intrinsic viscosity of the poly(arylene ether). In one embodiment, the intrinsic viscosity, as measured in chloroform at 25° C., may be at least about 0.1 deciliters/gram (dL/g), preferably at least about 0.15 dL/g, more preferably at least about 0.20 dL/g. The intrinsic viscosity may be up to about 0.50 dL/g, preferably up to about 0.45 dL/g, more preferably up to about 0.40 dL/g, yet more preferably up to about 0.35 dL/g. Generally, the intrinsic viscosity of a capped poly(arylene ether) will vary insignificantly from the intrinsic viscosity of the corresponding uncapped poly(arylene ether). It is expressly contemplated to employ blends of at least two capped poly(arylene ether)s having different molecular weights and intrinsic viscosities.

The composition may comprise the poly(arylene ether) in an amount of at least about 10 parts by weight, preferably at least about 15 parts by weight, more preferably at least about 20 parts by weight per 100 parts by weight resin. The composition may comprise the poly(arylene ether) in an amount up to about 50 parts by weight, preferably up to about 45 parts by weight, more preferably up to about 40 parts by weight per 100 parts by weight resin. It will be understood that "100 parts by weight resin" as used herein refers to the combined parts by weight of resinous components such as the poly(arylene ether), the acryloyl monomer, and the abrasive filler; it excludes non-resinous components such as the abrasive filler, and any secondary filler or curing catalyst.

The composition further comprises an acryloyl monomer. The acryloyl monomer comprises at least one acryloyl moiety having the structure

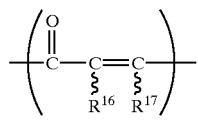

wherein $R^{16}$ and $R^{17}$ are each independently hydrogen or $C_1$–$C_{12}$ alkyl, and wherein $R^{16}$ and $R^{17}$ may be disposed either cis or trans about the carbon-carbon double bond. Preferably, $R^{16}$ and $R^{17}$ are each independently hydrogen or methyl. In one embodiment, the acryloyl monomer comprises at least two acryloyl moieties having the above structure and is termed a polyfunctional acryloyl monomer. In another embodiment, the acryloyl monomer comprises at least three acryloyl moieties having the above structure.

In one embodiment, the acryloyl monomer comprises at least one acryloyl moiety having the structure

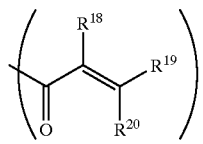

wherein $R^{18}$–$R^{20}$ are each independently hydrogen, $C_1$–$C_{12}$ alkyl, $C_2$–$C_{12}$ alkenyl, $C_6$–$C_{18}$ aryl, $C_7$–$C_{18}$ mixed (alkyl-aryl), $C_2$–$C_{12}$ alkoxycarbonyl, $C_7$–$C_{18}$ aryloxycarbonyl, $C_8$–$C_{18}$ mixed (alkyl-aryl)oxycarbonyl, nitrile, formyl, carboxylate, imidate, thiocarboxylate, or the like. Preferably, $R^{18}$–$R^{20}$ are each independently hydrogen or methyl. In one embodiment, the acryloyl monomer comprises at least two acryloyl moieties having the structure above. In another embodiment, the acryloyl monomer comprises at least three acryloyl moieties having the structure above.

Suitable acryloyl monomers include, for example, methyl (meth)acrylate, ethyl (meth)acrylate, isopropyl (meth) acrylate, n-butyl (meth)acrylate, isobutyl (meth) acrylate, 2-ethylhexyl (meth)acrylate, 2-hydroxyethyl (meth)acrylate, 3-hydroxypropyl (meth)acrylate, hydroxybutyl (meth) acrylate, glycidyl (meth)acrylate, 2,2-dimethyl-3-hydroxypropyl (meth)acrylate, isobornyl (meth)acrylate, tetrahydrofurfuryl (meth)acrylate, 3,4-epoxycyclohexylmethyl (meth)acrylate, and the like; halogenated (meth)acrylates such as pentabromobenzyl (meth) acrylate, and the like; and acrylic or methacrylic amides such (meth)acrylamide, diacetone (meth)acrylamide, N(2-hydroxyethyl) (meth)acrylamide, N-methyl(meth) acrylamide, N-ethyl(meth)acrylamide, N,N-dimethyl(meth) acrylamide, N,N-dimethylaminopropyl(meth)acrylamide, N,N-dimethylaminopropyl(meth)acrylamide, N,N-dimethylaminoethyl(meth)acrylamide, and the like; and mixtures comprising at least one of the foregoing acryloyl monomers. It will be understood that the suffix (meth)acryl- denotes either acryl- or methacryl-. Additional suitable acryloyl monomers are disclosed in U.S. Provisional Application Ser. No. 60/262,571, filed Jan. 18, 2001.

In one embodiment, the acryloyl monomer is substantially free of polymerizable moieties other than acryloyl moieties.

In a preferred embodiment, the acryloyl monomer is substantially free of polymerizable moieties other than acryloyl moieties. For example, in this embodiment, the acryloyl monomer may not comprise an allylic moiety, or a vinyl group directly bonded to an aromatic ring.

The composition may comprise the acryloyl monomer in an amount of at least about 5 parts by weight, preferably at least about 10 parts by weight, per 100 parts by weight resin. The composition may comprise the poly(arylene ether) in an amount up to about 60 parts by weight, preferably up to about 50 parts by weight, more preferably up to about 40 parts by weight per 100 parts by weight resin.

The composition further comprises an allylic monomer. An allylic monomer is herein defined as a monomer comprising an allylic moiety having the structure

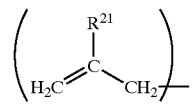

wherein $R^{21}$ may be hydrogen, $C_1$–$C_6$ alkyl, or the like. In a preferred embodiment, $R^{21}$ is hydrogen. When the allylic monomer comprises at least two allylic moieties, it is termed a polyfunctional allylic monomer.

Allylic monomers may include, for example, allylic alcohols, allyl esters, allyl ethers, and alkoxylated allylic alcohols. Allylic alcohols may have the general structure

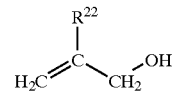

wherein $R^{22}$ is hydrogen or $C_1$–$C_6$ alkyl. Suitable allylic alcohols include allyl alcohol, methallyl alcohol, 2-ethyl-2propen-1-ol, and the like, and mixtures comprising at least one of the foregoing allylic alcohols.

Allyl esters may have the general structure

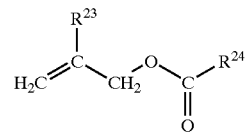

in which $R^{23}$ is hydrogen or $C_1$–$C_6$ alkyl, and $R^{24}$ is hydrogen or a saturated or unsaturated linear, branched, or cyclic $C_1$–$C_{30}$ alkyl, aryl, alkylaryl, or aralkyl group. Suitable allyl esters include, for example, allyl formate, allyl acetate, allyl butyrate, allyl benzoate, methallyl acetate, allyl fatty esters, and the like, and mixtures comprising at least one of the foregoing allyl esters.

Allyl ethers may have the general structure

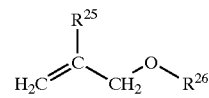

wherein $R^{25}$ is hydrogen or $C_1$–$C_6$ alkyl, and R is a saturated or unsaturated linear, branched, or cyclic $C_1$–$C_{30}$ alkyl, aryl, alkylaryl, or aralkyl group. Suitable allyl ethers include, for example, allyl methyl ether, allyl ethyl ether, allyl tert-butyl ether, allyl methylbenzyl ether, and the like, and mixtures comprising at least one of the foregoing allyl ethers.

Allylic monomers further include alkoxylated allylic alcohols. Alkoxylated allylic alcohols may have the general structure

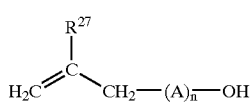

wherein $R^{27}$ is hydrogen or $C_1$–$C_6$ alkyl, A is an oxyalkylene group, and n, which is the average number of oxyakylene groups in the alkoxylated allylic alcohol, has a value from 1 to about 50. Oxyalkylene groups may include oxyethylene, oxypropylene, oxybutylenes, and mixtures comprising at least one of the foregoing oxyalkylene groups. Alkoxylated allylic alcohols can be prepared by reacting an allylic alcohol with up to about 50 equivalents of one or more alkylene oxides in the presence of a basic catalyst as described, for example, in U.S. Pat. Nos. 3,268,561 and 4,618,703. Alkoxylated allylic alcohols can also be made by acid catalysis, as described, for example, in *Journal of the American Chemical Society*, volume 71, pages 1152 ff. (1949).

In a preferred embodiment, the allylic monomer is a polyfunctional allylic monomer. Specific polyfunctional allylic monomers include, for example, diallyl adipate, diallyl citraconate, diallyl diglycolate, diallyl ether, diallyl fumarate, diallyl isophthalate, diallyl itaconate, diallyl maleate, diallyl phthalate, diallyl terephthalate, triallyl aconitate, triallyl cyanurate, triallyl isocyanurate, triallyl phosphate, triallyl trimellitate, tetraallyl o-silicic acid, and the like, and mixtures comprising at least one of the foregoing allylic monomers.

In a preferred embodiment, the allylic monomer is substantially free of polymerizable moieties other than allylic moieties. For example, in this embodiment, the allylic monomer may not comprise an acryloyl moiety or a vinyl group directly bonded to an aromatic ring.

The composition may comprise the allylic monomer in an amount of at least about 20 parts by weight, preferably at least about 30 parts by weight, more preferably at least about 40 parts by weight, per 100 parts by weight resin. The composition may comprise the allylic monomer in an amount up to about 80 parts by weight, preferably up to about 70 parts by weight, more preferably up to about 65 parts by weight, per 100 parts by weight resin.

The composition may, optionally, further comprise a curing catalyst to increase the curing rate of the unsaturated components. Curing catalysts, also referred to as initiators, are used to initiate the polymerization, cure or crosslink any of numerous thermoplastics and thermosets including unsaturated polyester, vinyl ester, and allylic thermosets. Non-limiting examples of curing catalysts are those described in "Plastic Additives Handbook, $4^{th}$ Edition" R. Gachter and H. Muller (eds.), P. P. Klemchuck (assoc. ed.) Hansen Publishers, New York 1993 and in U.S. Pat. No. 5,407,972 to Smith et al., and U.S. Pat. No. 5,218,030 to Katayose et al. The curing catalyst for the unsaturated portion of the thermoset would include any compound capable of producing radicals at elevated temperatures. Such curing catalysts would include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha, alpha'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di (benzoylperoxy)hexane, di(trimethylsilyl) peroxide, trimethylsilylphenyltriphenylsilyl peroxide, and the like, as well as mixtures comprising at least one of the foregoing curing agents. Typical non-peroxy initiators include, for example, 2,3-dimethyl-2,3-diphenylbutane, 2,3-trimethylsilyloxy-2,3-diphenylbutane, and the like, and mixtures comprising at least one of the foregoing curing catalysts.

Those skilled in the art may determine an appropriate amount of curing catalyst without undue experimentation. The curing catalyst amount may be at least about 0.1 part by weight, preferably at least about 1 part by weight, more preferably at least about 2 part by weight, per 100 parts by weight resin. The curing catalyst amount may be up to about 10 parts by weight, preferably up to about 5 parts by weight, per 100 parts by weight resin. It is preferred that the identity and amount of the curing catalyst be selected so as not to compromise the ability to process or maintain the curable formulation in powder form.

In addition to the components described above, the curable resin composition may further comprise at an additive selected from the group consisting of flame retardants, flame retardant synergists, mold release agents and other lubricants, antioxidants, thermal stabilizers, ultraviolet stabilizers, pigments, dyes, colorants, anti-static agents, fibrous reinforcements, disc-shaped fillers, low-aspect ratio fillers, synthetic resins, natural resins, thermoplastic elastomers, and the like, and mixtures comprising at least one of the foregoing additives. Such additives are known to those skilled in the art, and their amounts may be determined without undue experimentation. Non-limiting examples of additives are those described in "Plastic Additives Handbook, $4^{th}$ Edition" R. Gachter and H. Muller (eds.), P. P. Klemchuck (assoc. ed.) Hansen Publishers, New York 1993. Many specific additives are also described in U.S. Provisional Application Ser. No. 60/262,571, filed Jan. 18, 2001.

The composition may further comprise one or more fillers, including low-aspect ratio fillers, fibrous fillers, and polymeric fillers. Examples of such fillers well known to the art include those described in "Plastic Additives Handbook, $4^{th}$ Edition" R. Gachter and H. Muller (eds.), P. P. Klemchuck (assoc. ed.) Hansen Publishers, New York 1993. Non-limiting examples of fillers include silica powder, such as fused silica, crystalline silica, natural silica sand, and various silane-coated silicas; boron-nitride powder and boron-silicate powders; alumina and magnesium oxide (or magnesia); wollastonite including surface-treated wollastonite; calcium sulfate (as, for example, its anhydride, dihydrate or trihydrate); calcium carbonates including chalk, limestone, marble and synthetic, precipitated calcium carbonates, generally in the form of a ground particulate which often comprises 98+% $CaCO_3$ with the remainder being other inorganics such as magnesium carbonate, iron oxide and alumino-silicates; surface-treated calcium carbonates; talc, including fibrous, modular, needle shaped, and lamellar talcs; glass spheres, both hollow and solid, and surface-treated glass spheres typically having coupling agents such as silane coupling agents and/or containing a conductive coating; kaolin, including hard, soft, calcined kaolin, and kaolin comprising various coatings known to the art to facilitate the dispersion in and compatibility with the thermoset resin; mica, including metallized mica and mica surface treated with aminosilanes or acryloylsilanes coatings to impart good physicals to compounded blends; feldspar and nepheline syenite; silicate spheres; flue dust; cenospheres; fillite; aluminosilicate (atmospheres), including silanized and metallized aluminosilicate; quartz; quartzite; perlite; Tripoli; diatomaceous earth; silicon carbide; molybdenum sulfide; zinc sulfide; aluminum silicate (mullite); synthetic calcium silicate; zirconium silicate; barium titanate; barium ferrite; barium sulfate and heavy spar; particulate or fibrous aluminum, bronze, zinc, copper and nickel; carbon black, including conductive carbon black; graphite, such as graphite powder; flaked fillers and reinforcements such as glass flakes, flaked silicon carbide, aluminum diboride, aluminum flakes, and steel flakes; processed mineral fibers such as those derived from blends comprising at least one of aluminum silicates, aluminum oxides, magnesium oxides, and calcium sulfate hemihydrate; natural fibers including wood flour, cellulose, cotton, sisal, jute, starch, cork flour, lignin, ground nut shells, corn, rice grain husks; synthetic reinforcing fibers, including polyester fibers such as polyethylene terephthalate fibers, polyvinylalcohol fibers, aromatic polyamide fibers, polybenzimidazole fibers, polyimide fibers, polyphenylene sulfide fibers, polyether ether ketone fibers, boron fibers, ceramic fibers such as silicon carbide, fibers from mixed oxides of aluminum, boron and silicon; single crystal fibers or "whiskers" including silicon carbide, alumina fibers, boron carbide fibers, iron fibers, nickel fibers, copper fibers; glass fibers, including textile glass fibers such as E, A, C, ECR, R, S, D, and NE glasses, and quartz; vapor-grown carbon fibers include those having an average diameter of about 3.5 to about 500 nanometers as described in, for example, U.S. Pat. Nos. 4,565,684 and 5,024,818 to Tibbetts et al., U.S. Pat. No. 4,572,813 to Arakawa; U.S. Pat. Nos. 4,663,230 and 5,165,909 to Tennent, U.S. Pat. No. 4,816,289 to Komatsu et al., U.S. Pat. No. 4,876,078 to Arakawa et al., U.S. Pat. No. 5,589,152 to Tennent et al., and U.S. Pat. No. 5,591,382 to Nahass et al.; combinations comprising at least one of the foregoing fillers; and the like.

The above fillers may be used with various coatings, including, for example, metallic coatings and silane coating, to improve compatibility with and adhesion to the thermoset blend.

There is no particular limit on the amount of fillers employed in the composition, and filler amounts will depend on the end use of the composition. When present, the fillers may typically be used in an amount of up to about 2,000 parts by weight, preferably up to about 1500 parts by weight, more preferably about 1,000 to parts by weight, per 100 parts by weight total resin. Filler amounts will generally be at least about 1 part by weight, preferably at least 10 parts by weight, more preferably at least 20 parts by weight, per 100 parts by weight total resin.

In one embodiment, the composition is substantially free of alkenyl aromatic monomers in which an alkenyl substituent is directly bonded to an aromatic ring. By substantially free of alkenyl aromatic monomers, it is meant that such monomers are not intentionally added. Such alkenyl aromatic monomers include, for example, styrene, divinyl benzenes, and vinyl pyridine.

As the composition is defined as comprising multiple components, it will be understood that each component is chemically distinct, particularly in the instance that a single chemical compound may satisfy the definition of more than one component.

One advantage of the composition is its ability to be formulated as a powder. For some applications, it may be preferred that the powder be substantially free of particles having any dimension greater than about 300 micrometers, preferably substantially free of particles having any dimension greater than about 150 micrometers, more preferably substantially free of particles having any dimension greater than about 100 micrometers, yet more preferably substantially free of particles having any dimension greater than about 50 micrometers. By substantially free, it is meant that the composition includes less than 5% by weight, preferably less than 2% by weight, more preferably less than 1% by weight of particles having the specified dimensions. In one embodiment, the composition may be formulated as a mixture comprising curable resin particles and abrasive filler particles, with the particle size limitations above applying only to the curable resin particles.

In order to facilitate handling under ambient conditions, it may be preferred that the composition have a melting temperature of at least about 50° C., preferably at least about 60° C., more preferably at least about 70° C. To ensure melting below typical molding temperatures, it may be preferred that the composition have a melting temperature up to about 150° C., preferably up to about 140° C., more preferably up to about 130° C.

In one embodiment, the composition comprises about 10 to about 50 parts by weight of a poly(arylene ether); about 5 to about 60 parts by weight of an acryloyl monomer; and about 20 to about 80 parts by weight of an allylic monomer; wherein all parts by weight are based on 100 parts by weight resin; and wherein the composition is a powder.

In another embodiment, the composition comprises about 15 to about 45 parts by weight of a capped poly(arylene ether); about 10 to about 40 parts by weight of a polyfunctional acryloyl monomer; and about 30 to about 70 parts by weight of a polyfunctional allylic monomer; wherein all parts by weight are based on 100 parts by weight resin; and wherein the composition is a powder.

In yet another embodiment, the composition comprises about 25 to about 35 parts by weight of a capped poly(2,6-dimethyl-1,4-phenylene ether); about 10 to about 20 parts by weight of trimethylolpropane triacrylate or trimethylolpropane trimethacrylate; and about 50 to about 60 parts by weight of diallyl phthalate; wherein all parts by weight are based on 100 parts by weight resin; and wherein the composition is a powder.

It will be understood that the invention encompasses reaction products of any of the above described curable compositions, as well as articles comprising the cured compositions.

One advantage of the cured resin compositions is their improved toughness. This may be manifested, for example, in a fracture toughness (K1C) measured according to ASTM D5045 of at least about 0.9 Mpa-m$^{1/2}$, preferably at least about 1.0 Mpa-m$^{1/2}$, more preferably at least about 1.1 Mpa-m$^{1/2}$, yet more preferably at least about 1.2 Mpa-m$^{1/2}$.

Processes useful for processing the composition include casting, including for example centrifugal and static casting; contact molding, including cylindrical contact molding; compression molding; lamination including wet or dry lay up and spray lay up; resin transfer molding, including vacuum assisted resin transfer molding and chemically assisted resin transfer molding; SCRIMP processing; pultrusion; formation into high strength composites; open molding or continuous combination of resin and glass; filament winding, including cylindrical filament winding; and the like; as well as combinations comprising at least one of the foregoing processes. Additional processes have been described in "Polyesters and Their Applications" by Bjorksten Research Laboratories, Johan Bjorksten (pres.) Henry Tovey (Ch. Lit. Ass.), Betty Harker (Ad. Ass.), James Henning (Ad. Ass.), Reinhold Publishing Corporation, New York, 1956, "Uses of Epoxy Resins", W. G. Potter, Newnes-Buttersworth, London 1975, "Chemistry and Technology of Cyanate Ester Resins" by I. Hamerton, Blakie Academic Publishing an Imprint of Chapman Hall. The powdered resin composition is useful for mixing with other powdered additives to form a dry mix, in that blending is accomplished more readily than when the resin composition is a viscous liquid or paste. Use of the powdered resin composition is particularly advantageous when the additive portion comprises the majority of the blend, for example about 70 to about 80 weight percent of the total composition, the balance being the curable resin.

In one embodiment, the composition may be prepared by a method comprising blending a poly(arylene ether) and an allylic monomer to form a first intimate blend; blending the first intimate blend and an acryloyl monomer to form a second intimate blend; and processing the second intimate blend to form a curable powder. Processing the second intimate blend to form a curable powder may preferably comprise grinding the second intimate blend at a temperature up to about −75° C., preferably up to about −150° C., more preferably up to about −170° C., yet more preferably up to about −190° C. Such temperatures embrittle the resin, thereby facilitating grinding into small particles. For example, the resin may be cryogenically ground by immersing the resin in liquid nitrogen and allowing to cool to −196° C.; it may then be transferred rapidly into the opening of a grinder in a portion-wise fashion where it may contact a rotating screen of the desired mesh size, passing through the mesh to a collection reservoir. Equipment to perform cryogenic grinding is commercially available from, for example, Retsch/Brinkmann as the ZM-1 Grinder. The method may further comprise blending the curable powder with a curing catalyst.

In another embodiment, the composition may be prepared by a method comprising blending about 20 to about 80 parts by weight of an allylic monomer with about 10 to about 50 parts by weight of a poly(arylene ether) to form a first intimate blend; blending the first intimate blend with about 5 to about 60 parts by weight of an acryloyl monomer to form a second intimate blend; grinding the second intimate blend at a temperature less than about −75° C. to form a first curable powder; and blending the first powder with a curing catalyst to form a second curable powder.

There is no particular limitation on the method by which the composition may be cured. The composition may, for example, be cured thermally or by using irradiation techniques, including UV irradiation and electron beam irradiation.

The invention is further illustrated by the following non-limiting examples.

EXAMPLE 1

Diallyl phthalate (510 grams; obtained from Aldrich as a liquid of 97% purity) was heated to 160–165° C. in a glass reaction vessel. To this was added methacrylate-capped poly(2,6-dimethyl-1,4-phenylene ether) (340 grams) having an intrinsic viscosity of 0.25 dL/g as measured at 25° C. in chloroform. The capped poly(arylene ether) was prepared by reaction of the corresponding uncapped poly (arylene ether) with methacrylic anhydride, using procedures described in U.S. patent application Ser. No. 09/440,747, filed Nov. 16, 1999. The mixture was stirred and heated until the poly (arylene ether) completely dissolved. Trimethylolpropane trimethacrylate (150 grams; obtained from Sartomeras a neat liquid) was then added to the reaction flask and mixed until it was completely blended. The solution was then poured into a flat container and allowed to cool so that it could form a hardened, wax-like substance. The resin mixture was cooled to −196° C. in liquid nitrogen and rapidly transferred to a Retsch/Brinkmann as the ZM-1 Grinder where it was ground to produce a powdered resin having particle sizes less than 50 grit. To the powdered resin was then added an initiator, dicumyl peroxide, at 2 weight percent of the total resin blend.

A portion of the powdered resin was compression molded at 150° C. for 10 minutes at pressure of about 200 pounds per square inch (psi) using methods known to those skilled in the art. The specimen was a solid transparent disk of nominal dimensions 3 inches diameter and 0.125 inches in thickness.

Various samples prepared according to the above procedure were further cured for 2 hours at 150–160° C. Hardness was measured on several samples using a Barcol Tester (ASTM D2583), yielding Barcol hardness values of about 30 to 40. Hardness was also determined qualitatively by depressing the tip of a blunt probe into the surface. No indentation of the surface was observed. Toughness was determined qualitatively by subjecting the samples to human-hand bending forces (no perceptible bending occurred) and by impacting the samples with a 20 ounce hammer (the samples did not fracture).

A portion of the powdered resin was compression molded at 140° C. for 5 minutes using methods known to those skilled in the art. The resultant specimen was a solid transparent disk of nominal dimensions 2.5 inches diameter and 0.125 inches in thickness, being pore-free, crack-free, and substantially hard and tough. Eight replicate specimens were likewise prepared. Five of the nine specimens were post-cured at 165° C. for 1 hour. For comparison purposes, similar specimens were molded from the vinyl ester resin sold by Dow Chemical Company as DERAKANE® M311–450. Fracture toughness was measured according ASTM D5045, after the specimens were machined to the proper size and notched, and a crack was initiated in the notch. Fracture toughness values, expressed as mean ±standard deviation, are reported in the Table below. The results show that the cured resin composition exhibits improved toughness versus the commercially available vinyl ester resin.

TABLE

| resin type | post-cured? | K1C Mpa-m$^{1/2}$) |
|---|---|---|
| (this example) | no | 1.28 ± 0.12 |
| (this example) | yes | 1.14 ± 0.05 |
| DERAKANE ® M311-450 | no | 0.82 ± 0.12 |

EXAMPLE 2

The procedure of Example 1 was repeated, varying amounts of diallyl phthalate (600 grams), methacrylate-capped poly(2,6-dimethyl-1,4-phenylene ether) (250 grams), and trimethylolpropane trimethacrylate (150 grams). The compression molded sample was a solid transparent disk of nominal dimensions 3 inches diameter and 0.125 inches in thickness. Hardness and toughness tests conducted after further curing, as described in Example 1, showed the molded sample to be hard and tough.

EXAMPLE 3

The procedure of Example 1 was repeated, varying amounts of diallyl phthalate (550 grams), methacrylate-capped poly(2,6-dimethyl-1,4-phenylene ether) (300 grams), and trimethylolpropane trimethacrylate (150 grams). In this example, the methacrylate-capped poly(2,6-dimethyl-1,4-phenylene ether) had an intrinsic viscosity of 0.30 dL/g and was prepared using the same procedure used to prepare the 0.25 dL/g material. The compression molded sample was a solid transparent disk of nominal dimensions 3 inches diameter and 0.125 inches in thickness, being substantially hard and tough. Hardness and toughness tests conducted after further curing, as described in Example 1, showed the molded sample to be hard and tough.

EXAMPLE 4

A quantity of 9 grams of the powdered resin described in Example 1 was dry blended with 10 grams of silicon carbide powder having a grit size of 500 and 31 grams of silicon carbide powder having a grit size of 150. This resin/abrasive blend was then compression molded for 15 minutes at 155° C. and a pressure of about 2000 psi using methods known to those skilled in the art. The resultant specimen was a solid disk of nominal dimensions 3 inches diameter and 0.125 inches in thickness, being substantially hard and tough. Using the same blend of resin/abrasives, two more specimens were molded, each resulting in a substantially hard and tough material. Hardness and toughness tests conducted after further curing, as described in Example 1, showed the molded sample to be hard and tough.

It should be noted that the chemical components of the resin composition allow it to be cured without generating volatiles. This advantage is not shared by phenolic resins, the curing of which generates volatile products that produce a porous structure in the cured resin that detracts from its physical properties.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents and other references are incorporated herein by reference in their entirety.

What is claimed is:

1. A curable resin composition, comprising:
a poly(arylene ether); wherein the poly(arylene ether) is a capped poly(arylene ether) produced by capping a poly(arylene ether) consisting essentially of the polymerization product of at least one monohydric phenol having the structure

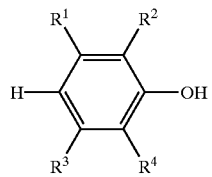

wherein $R^1$–$R^4$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbonoxy, $C_2$–$C_{12}$ halohydrocarbonoxy wherein at least two carbon atoms separate the halogen and oxygen atoms;
an acryloyl monomer; and
an allylic monomer;
wherein the curable resin composition is a powder.

2. The curable resin composition of claim 1, wherein the poly(arylene ether) has a free hydroxyl group content less than about 500 micrograms per gram.

3. The curable resin composition of claim 1, wherein the capped poly(arylene ether) comprises a capping group having the structure

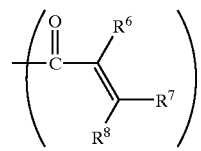

wherein $R^6$–$R^8$ are each independently selected from the group consisting a hydrogen, $C_1$–$C_{12}$ alkyl, $C_2$–$C_{12}$ alkenyl, $C_6$–$C_{18}$ aryl, $C_7$–$C_{18}$ mixed (alkyl-aryl), $C_1$–$C_{12}$ alkoxycarbonyl, $C_7$–$C_{18}$ aryloxycarbonyl, $C_8$–$C_{18}$ mixed (alkyl-aryl)oxycarbonyl, nitrile, formyl, carboxylate, imidate, and thiocarboxylate.

4. The curable resin composition of claim 1, wherein the poly(arylene ether) has an intrinsic viscosity of about 0.1 to about 0.5 deciliters/gram in chloroform at 25° C.

5. The curable resin composition of claim 1, comprising about 10 to about 50 parts by weight of the poly(arylene ether) per 100 parts by weight resin.

6. The curable resin composition of claim 1, wherein the acryloyl monomer comprises at least one acryloyl moiety having the structure

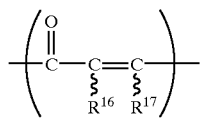

wherein $R^{16}$ and $R^{17}$ are each independently selected from the group consisting of hydrogen and $C_1$–$C_{12}$ alkyl, and wherein $R^{16}$ and $R^{17}$ may be disposed either cis or trans about the carbon-carbon double bond.

7. The curable resin composition of claim 1, wherein the acryloyl monomer comprises at least one acryloyl moiety having the structure

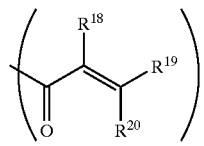

wherein $R^{18}$–$R^{20}$ are each independently selected from the group consisting of hydrogen, $C_1$–$C_{12}$ alkyl, $C_2$–$C_{12}$ alkenyl, $C_6$–$C_{18}$ aryl, $C_7$–$C_{18}$ mixed (alkyl-aryl), $C_2$–$C_{12}$ alkoxycarbonyl, $C_7$–$C_{18}$ aryloxycarbonyl, mixed $C_8$–$C_{18}$ (alkyl-aryl)oxycarbonyl, nitrile, formyl, carboxylate, imidate, and thiocarboxylate.

8. The curable resin composition of claim 7, wherein the acryloyl monomer comprises at least two acryloyl moieties.

9. The curable resin composition of claim 1, wherein the acryloyl monomer is selected from the group consisting of trimethylolpropane trimethacrylate, trimethylolpropane triacrylate, 1,6-hexanediol dimethacrylate, 1,6-hexanediol diacrylate, ethylene glycol dimethacrylate, ethylene glycol diacrylate, propylene glycol dimethacrylate, propylene glycol diacrylate, cyclohexanedimethanol dimethacrylate, cyclohexanedimethanol diacrylate, butanediol dimethacrylate, butanediol diacrylate, diethylene glycol dimethacrylate, diethylene glycol diacrylate, triethylene glycol dimethacrylate, triethylene glycol diacrylate, isobornyl methacrylate, isobornyl acrylate, methyl methacrylate, methyl acrylate, and mixtures comprising at least one of the foregoing acryloyl monomers.

10. The curable resin composition of claim 1, wherein the acryloyl monomer is selected from the group consisting of trimethylolpropane trimethacrylate, trimethylolpropane triacrylate, and combinations comprising at least one of the foregoing acryloyl monomers.

11. The curable resin composition of claim 1, comprising about 5 to about 60 parts by weight of the acryloyl monomer per 100 parts by weight resin.

12. The curable resin composition of claim 1, wherein the allylic monomer comprises an allylic moiety having the structure

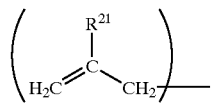

wherein $R^{21}$ is selected from the group consisting of hydrogen and $C_1$–$C_6$ alkyl.

13. The curable resin composition of claim 12, wherein the allylic monomer comprises at least two allylic moieties.

14. The curable resin composition of claim 1, wherein the allylic monomer is selected from the group consisting of allyl alcohol, methallyl alcohol, 2-ethyl-2-propen-1-ol, allyl formate, allyl acetate, allyl butyrate, allyl benzoate, methallyl acetate, allyl fatty esters, allyl methyl ether, allyl ethyl ether, allyl tert-butyl ether, allyl methylbenzyl ether, alkoxylated allylic alcohols, diallyl adipate, diallyl citraconate, diallyl diglycolate, diallyl ether, diallyl fumarate, diallyl isophthalate, diallyl itaconate, diallyl maleate, diallyl phthalate, diallyl terephthalate, triallyl aconitate, triallyl cyanurate, triallyl isocyanurate, triallyl phosphate, triallyl trimellitate, tetraallyl o-silicic acid, and mixtures comprising at least one of the foregoing allylic monomers.

15. The curable resin composition of claim 1, wherein the allylic monomer is selected from the group consisting of diallyl adipate, diallyl citraconate, diallyl diglycolate, diallyl ether, diallyl fumarate, diallyl isophthalate, diallyl itaconate, diallyl maleate, diallyl phthalate, diallyl terephthalate, triallyl aconitate, triallyl cyanurate, triallyl isocyanurate, triallyl phosphate, triallyl trimellitate, tetraallyl o-silicic acid, and mixtures comprising at least one of the foregoing allylic monomers.

16. The curable resin composition of claim 1, wherein the allylic monomer is diallyl phthalate.

17. The curable resin composition of claim 1, wherein the allylic monomer is substantially free of polymerizable moieties other than allylic moieties.

18. The curable resin composition of claim 1, comprising about 20 to about 80 parts by weight of the allylic monomer per 100 parts by weight resin.

19. The curable resin composition of claim 1, further comprising a curing catalyst.

20. The curable resin composition of claim 19, wherein the curing catalyst is selected from the group consisting of benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy) butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, 2,3-dimethyl-2,3-diphenylbutane, 2,3-trimethylsilyloxy-2,3-diphenylbutane, and mixtures comprising at least one of the foregoing curing catalysts.

21. The curable resin composition of claim 19, comprising about 0.1 to about 10 parts by weight of the initiator per 100 parts by weight resin.

22. The curable resin composition of claim 1, further comprising an additive selected from the group consisting of flame retardants, flame retardant synergists, mold release agents, lubricants, antioxidants, thermal stabilizers, ultraviolet stabilizers, pigments, dyes, colorants, anti-static agents, fibrous reinforcements, disc-shaped fillers, low-aspect ratio fillers, synthetic resins, natural resins, thermoplastic elastomers, and mixtures comprising at least one of the foregoing additives.

23. The curable resin composition of claim 1, further comprising a filler.

24. The curable resin composition of claim 23, comprising a filler selected from the group consisting of silica powder, fused silica, crystalline silica, natural silica sand, boron-nitride powder, boron-silicate powder, alumina, magnesium oxide, wollastonite, calcium sulfate, calcium carbonate, talc, glass spheres, kaolin, mica, feldspar, nepheline syenite, silicate spheres, flue dust, cenospheres, fillite, aluminosilicate, quartz, quartzite, perlite, Tripoli, diatomaceous earth, silicon carbide, molybdenum sulfide, zinc sulfide, mullite, calcium silicate, zirconium silicate, barium titanate, barium ferrite, barium sulfate, aluminum, bronze, zinc, copper, nickel, carbon black, graphite, glass flakes, flaked silicon carbide, flaked aluminum diboride, aluminum flakes, steel flakes, wood flour, cellulose, cotton, sisal, jute, starch, cork flour, lignin, ground nut shells, corn, rice grain husks, polyester fibers, polyvinylalcohol fibers, aromatic polyamide fibers, polybenzimidazole fibers, polyimide fibers, polyphenylene sulfide fibers, polyether ether ketone fibers, boron fibers, silicon carbide fibers, mixed oxide fibers, silicon carbide fibers, alumina fibers, boron carbide fibers, iron fibers, nickel fibers, copper fibers, glass fibers, quartz, vapor-grown carbon fibers, combinations comprising at least one of the foregoing fillers, and combinations comprising at least one of the foregoing fillers and a surface-treating agent.

25. The curable resin composition of claim 1, wherein the composition is substantially free of alkenyl aromatic monomers in which alkenyl substituent is directly bonded to an aromatic ring.

26. The curable resin composition of claim 1, wherein the powder is substantially free of particles having any dimension greater than about 300 micrometers.

27. The curable resin composition of claim 1, having a melting temperature greater than about 50° C.

28. A curable resin composition, comprising:
    about 10 to about 50 parts by weight of a poly(arylene ether); wherein the poly(arylene ether) is a capped poly(arylene ether) produced by capping a poly(arylene ether) consisting essentially of the polymerization product of at least one monohydric phenol having the structure

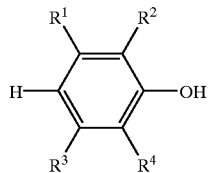

wherein $R^1$–$R^4$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyl, phenyl, $C_1$–$C_{12}$ haloalkyl, $C_1$–$C_{12}$ aminoalkyl, $C_1$–$C_{12}$ hydrocarbonoxy, $C_2$–$C_{12}$ halohydrocarbonoxy wherein at least two carbon atoms separate the halogen and oxygen atoms;

about 5 to about 60 parts by weight of an acryloyl monomer; and about 20 to about 80 parts by weight of an allylic monomer;

wherein all parts by weight are based on 100 parts by weight resin; and wherein the composition is a powder.

29. A resin composition, comprising:

about 15 to about 45 parts by weight of a capped poly(arylene ether) produced by capping a poly(arylene ether) consisting essentially of the polymerization product of at least one monohydric phenol having the structure

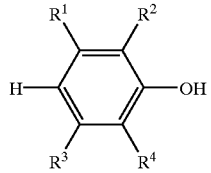

wherein $R^1$–$R^4$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyl, phenyl, $C_1$–$C_{12}$ haloalkyl, $C_1$–$C_{12}$ aminoalkyl, $C_1$–$C_{12}$ hydrocarbonoxy, $C_2$–$C_{12}$ halohydrocarbonoxy wherein at least two carbon atoms separate the halogen and oxygen atoms;

about 10 to about 40 parts by weight of a polyfunctional acryloyl monomer; and about 30 to about 70 parts by weight of a polyfunctional allylic monomer;

wherein all parts by weight are based on 100 parts by weight resin; and wherein the composition is a powder.

30. A resin composition, comprising:

about 25 to about 35 parts by weight of a capped poly(2,6-dimethyl-1,4-phenylene ether);

about 10 to about 20 parts by weight of trimethylolpropane triacrylate or trimethylolpropane trimethacrylate; and about 50 to about 60 parts by weight of diallyl phthalate;

wherein all parts by weight are based on 100 parts by weight resin; and wherein the composition is a powder.

31. A cured resin composition, comprising the reaction product of:

a poly(arylene ether); wherein the poly(arylene ether) is a capped poly(arylene ether) produced by capping a poly(arylene ether) consisting essentially of the polymerization product of at least one monohydric phenol having the structure

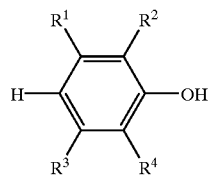

wherein $R^1$–$R^4$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyl, phenyl, $C_1$–$C_{12}$ haloalkyl, $C_1$–$C_{12}$ aminoalkyl, $C_1$–$C_{12}$ hydrocarbonoxy, $C_2$–$C_{12}$ halohydrocarbonoxy wherein at least two carbon atoms separate the halogen and oxygen atoms;

an acryloyl monomer; and an allylic monomer;

wherein the cured resin composition is the cured product of a curable powder resin composition.

32. The cured resin composition of claim 31, having a fracture toughness value, K1C, measured according to ASTM D5045 of at least about 0.9 Mpa-m$^{1/2}$.

33. An article comprising the composition of claim 31.

34. A method of forming a curable resin composition, comprising:

blending a poly(arylene ether) and an allylic monomer to form a first intimate blend; wherein the poly(arylene ether) is a capped poly(arylene ether) produced by capping a poly(arylene ether) consisting essentially of the polymerization product of at least one monohydric phenol having the structure

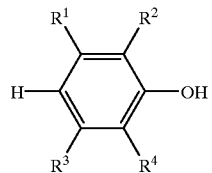

wherein $R^1$–$R^4$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbonoxy, $C_2$–$C_{12}$ halohydrocarbonoxy wherein at least two carbon atoms separate the halogen and oxygen atoms;

blending the first intimate blend and an acryloyl monomer to form a second intimate blend; and processing the second intimate blend to form a curable powder.

35. The method of claim 34, wherein processing the second intimate blend to form a curable powder comprises grinding at a temperature less than about −75° C.

36. The method of claim 34, further comprising blending the curable powder with a curing catalyst.

37. A method of preparing a curable composition, comprising:

blending about 20 to about 80 parts by weight of an allylic monomer with about 10 to about 50 parts by weight of a poly(arylene ether) to form a first intimate blend; wherein the poly(arylene ether) is a capped poly (arylene ether) produced by capping a poly(arylene ether) consisting essentially of the polymerization product of least one monohydric phenol having the structure

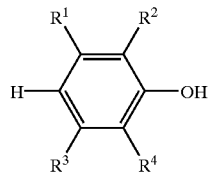

wherein $R^1$–$R^4$ are each independently hydrogen, halogen, primary or secondary $C_1$–$C_{12}$ alkyl, $C_2$–$C_{12}$ alkenyl, $C_2$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbonoxy, $C_2$–$C_{12}$ halohydrocarbonoxy wherein at least two carbon atoms separate the halogen and oxygen atoms;

blending the first intimate blend with about 5 to about 60 parts by weight of an acryloyl monomer to form a second intimate blend;

grinding the second intimate blend at a temperature less than about −75° C. to form a first curable powder; and blending the first powder with a curing catalyst to form a second curable powder;

wherein all parts by weight are based on 100 parts by weight resin.

* * * * *